UNITED STATES PATENT OFFICE 2,208,033

PRODUCTION OF SODIUM CYANATE

Hermann Theodor Josef König, Dordrecht, Netherlands, assignor to Stikstofbindings-industrie Nederland N. V., Dordrecht, Netherlands No Drawing. Application July 11, 1938, Serial No. 218,638. In the Netherlands July 19, 1937

4 Claims. (Cl. 23—75)

This invention relates to the production of products containing sodium cyanate.

It has been found that if a mixture of stoichiometric proportions of alkaline earth cyanamides and anhydrous high percentage sodium sulfide is heated to elevated temperatures, sodium cyanate and alkaline earth sulfides are formed, if the mixture is caused to react in the presence of carbon dioxide.

When using a mixture of calcium cyanamide and anhydrous sodium sulfide the course of the reactions, for instance at a temperature of 500° C., may be expressed by the following equations:

(a) $CaNCN + Na_2S = Na_2NCN + CaS$
(b) $Na_2NCN + CO_2 = 2NaCNO$

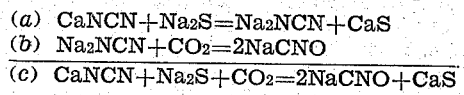
(c) $CaNCN + Na_2S + CO_2 = 2NaCNO + CaS$

Instead of sodium sulfide or in addition to sodium sulfides also sodium fluoride may be used and in that case, if for instance sodium fluoride and calcium cyanamide (containing 69/70% CaNCN) are heated in the presence of carbon dioxide to about 550° C., cyanate is also formed according to the equations:

(d) $CaNCN + 2NaF = Na_2NCN + CaF_2$
(b) $Na_2NCN + CO_2 = 2NaCNO$

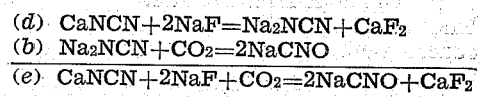
(e) $CaNCN + 2NaF + CO_2 = 2NaCNO + CaF_2$

It has further been ascertained that the sodium compounds mentioned above may be replaced, partly or altogether, by sodium carbonate. If for instance a mixture of stoichiometric proportions of soda and calcium cyanamide, as above, is heated in a current of carbon dioxide to 600° C., one obtains a reaction product containing sodium cyanate and calcium carbonate according to the equations:

(f) $CaNCN + Na_2CO_3 = Na_2NCN + CaCO_3$
(b) $Na_2NCN + CO_2 = 2NaCNO$

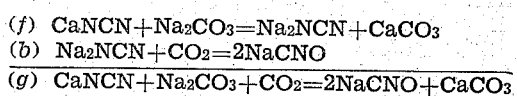
(g) $CaNCN + Na_2CO_3 + CO_2 = 2NaCNO + CaCO_3$

The specification of German Patent No. 490,247 describes that when heating a mixture of alkali carbonates and alkaline earth cyanamides to elevated temperatures in the absence of oxydation agents, alkali cyanates are formed according to the equation:

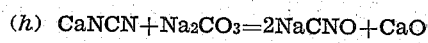
(h) $CaNCN + Na_2CO_3 = 2NaCNO + CaO$ however this reaction $h$ cannot be equalled to the reaction $g$ mentioned above. For in the reaction $h$ there is always obtained a product containing calcium oxide which is able, for instance at 600° C., to again react with sodium cyanate under formation of cyanamide.

If for instance a mixture of stoichiometric proportions of sodium cyanate and calcium oxide is heated one hour to 600° C. in a nitrogen atmosphere, the reaction results in the formation of a product containing about 30% CaNCN, wherein about 76% of the cyanate-nitrogen introduced is present as cyanamide nitrogen. 3% are converted into NaCN.

It is of no avail whether in this reaction are formed sodium or calcium cyanamide, or a mixture of these compounds, according to the equations:

(i) $CaO + 2NaCNO = Na_2NCN + CaCO_3$
(k) $CaO + 2NaCNO = CaNCN + Na_2CO_3$

This does not however influence the fact that the greater part of the nitrogen introduced as sodium cyanate is converted into cyanamide nitrogen.

Thus at and below 600° C. the reaction according to the equation:

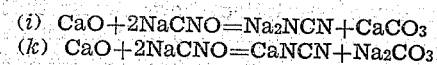
$Na_2CO_3 + CaNCN = 2NaCNO + CaO$ cannot possibly develop towards the right hand side.

Different tests have in fact shown that at and below 600° C. a mixture of stoichiometric proportions of soda and calcium cyanamide (containing 69/70% CaNCN) is not able to react according to equation $h$. After one hour's heating in a nitrogen atmosphere the quantity of nitrogen introduced under the form of CaNCN can be recovered as cyanamide nitrogen practically completely, save for a certain loss of 2.5–6%.

If in contrast thereto the mixture mentioned above is heated one hour to 600° C. in a current of carbon dioxide, then apart from about 7% losses, the whole of the nitrogen introduced under the form of cyanamide is converted into cyanate nitrogen.

If the two modes of operation described above are compared with each other it must be conceded that the presence of carbon dioxide exerts a very favorable influence on the reaction between soda and calcium cyanamide.

For the sake of simplicity this reaction may also be regarded in this manner that the carbon dioxide removes the calcium oxide, which hinders the formation of cyanate or prevents its formation, whereby the reaction according to equation $g$ can develop to the right hand side.

It appeared obvious to carry out the reaction of calcium cyanamide with soda at temperatures above 600° C. to the end of causing, by the use of still higher temperatures, the reaction according to the equation:

$$Na_2CO_3 + CaNCN = 2NaCNO + CaO$$

to develop more towards the right hand side.

Thus if a mixture of for instance 106 parts by weight soda and 116 parts calcium cyanamide (containing 69% CaNCN) is heated to 650° C. it is true that a better conversion of the calcium cyanamide introduced is obtained, but the higher temperature causes undesirable secondary reactions to occur.

Besides sodium cyanate there is also formed sodium cyanide and moreover the loss of nitrogen is considerably greater than when heating the mixture of these starting materials to 600° C. or below, whereby however, as described above, little or no cyanate is formed.

The formation of sodium cyanide and the losses of nitrogen are caused, amongst others, by the following secondary reactions, which are favorably influenced by higher temperatures:

(l) $4NaCNO = 2NaCN + Na_2CO_3 + N_2 + CO$
(m) $5NaCNO = 3NaCN + Na_2CO_3 + N_2 + CO_2$

The reaction products obtained at 650° C. moreover always contain also considerable quantities of sodium or calcium cyanamide which cannot be converted into cyanate. Thus also at temperatures above 600° C. it was not possible to cause the reaction according to equation $h$ to develop towards the right.

The above description shows clearly that the reaction of sodium carbonate with alkaline earth cyanamides for the formation of sodium cyanate at higher temperatures in the presence of carbon dioxide offers great advantages as compared to the known mode of proceeding, wherein the solid components react with each other in the absence of oxydation agents.

The influence of the carbon dioxide guarantees a practically complete and considerably faster formation of cyanate, which is due not only to the disturbance of the equilibrium mentioned above, but also to the heat developed in the exothermic reaction:

$$CaO + CO_2 = CaCO_3$$

It renders it further possible to cause the introduced starting materials to react at such temperatures at which, in the absence of carbon dioxide, no or only very incomplete conversions of the cyanamide into cyanate take place.

It may further be stated that heating in a carbon dioxide atmosphere leads to reaction products, which are practically free from undesirable compounds such as for instance sodium cyanides, sodium and alkaline earth cyanamides and alkaline earth oxides.

The sodium cyanate obtained can be separated in a simple manner, for instance with water, from the alkaline earth compounds, such as calcium carbonate, formed in the reaction and from other impurities contained in the reaction mass. It is impossible for any alkaline earth compounds to go into the solution, since all of them were converted into compounds insoluble in water.

The carbon dioxide may be caused to act on the mixture of the starting materials at normal pressure or at pressures above or below normal.

One may also use gases containing carbon dioxide, provided that they are free from constituents adapted to disturb the reaction, such as oxygen or water vapor. Thus for instance smoke gases containing about 17/18% $CO_2$ and about 80% $N_2$, after having been freed from injurious constituents such as water vapor, sulfur dioxide and oxygen can be used with advantage.

One may further use as sources of carbon dioxide also compounds containing $CO_2$, such as for instance magnesium carbonate, which develop $CO_2$ within the range of 350 to 650° C.

In practicing this invention, one may for instance proceed as follows:

*Example 1*

16.743 grams of a mixture consisting of 85 parts sodium fluoride and 113 parts calcium cyanamide (containing 70.5% CaNCN) were heated 15 minutes to 550° C. in a carbon dioxide current in such manner that no vacuum can be formed. The reaction mass is then allowed to react further one hour in an atmosphere of carbon dioxide at 550° C.

After this heat treatment were obtained 20.833 grams of a reaction product weighing 4.09 grams = 24.5% more, which apart from 0.5% sodium cyanide and 1.5% cyanamide (calculated as CaNCN) contained 46.6% sodium cyanate.

Thus 89.0% of the cyanamide nitrogen introduced is converted into cyanate nitrogen, while 5.5% of the cyanamide nitrogen used is lost during the heating.

*Example 2*

14.096 grams of a mixture consisting of 80 parts sodium sulfide (containing 99% $Na_2S$) and 113 parts calcium cyanamide (containing 70.5% CaNCN) were heated 15 minutes to 500° C. in a vigorous current of carbon dioxide. Already at about 450° C. the mixture of the starting products avidly absorbed carbon dioxide. After the heat treatment at 500° C. the reaction mass was left a further hour in an atmosphere of carbon dioxide at the same temperature.

The reaction product obtained, which weighed 20.34 grams of 6.245 grams (44.2%) more, contained after the conversion, apart from 0.5% cyanamide (calculated as CaNCN and 5.5% $Na_2S_2O_3$ 40.4% sodium cyanate.

Thus about 87% of the cyanamide nitrogen introduced were converted into cyanate nitrogen.

*Example 3*

16.920 grams of a pulverulent mixture consisting of 106 parts soda (containing 99% $Na_2CO_3$) and 116 parts calcium cyanamide (containing 69% CaNCN) were heated, as described with reference to Examples 1 and 2, 15 minutes to 550° C. in a current of carbon dioxide. The reaction product was then left another hour at this temperature in a slow current of carbon dioxide.

After the reaction was obtained a mass containing cyanate, which weighed 20.402 grams or 3.482 grams (20.6%) more and which contained besides 0.48% sodium cyanide and 3.3% calcium cyanamide 37% sodium cyanate.

76.5% of the cyanamide nitrogen introduced were thus converted into cyanate nitrogen. 11.2% did not react, 1.3% were converted into NaCN and 11.0% cyanamide nitrogen were lost.

If, for the sake of comparison, the above mixture was heated in the manner described above in an atmosphere of nitrogen—not in a current of nitrogen—no sodium cyanate could be traced.

*Example 4*

17.277 grams of a mixture, such as described with reference to Example 3, were heated 15 minutes to 600° C. in a current of carbon dioxide in such manner that no pressure below normal occurred. The mass was then left another hour to react further in a slow current of carbon dioxide. After the conversion were formed 21,265 grams of a product of reaction weighing 3.988 grams (23.2%) more, which contained 0.69% NaCN and 43% NaCNO. 91% of the CaNCN were thus converted into NaCNO.

If in contrast thereto, 16.964 grams of the above mixture were heated 15 minutes to 600° C. in a nitrogen atmosphere, allowing the mass to stand another hour at this temperature, as above described, there resulted a product of reaction weighing 16.964 grams, which contained 1.3% NaCN and 32.8% CaNCN.

This shows, that 91% of the cyanamide nitrogen introduced were not converted. 6% of this compound were lost in the conversion and 3% were present in the form of NaCN.

*Example 5*

15.55 grams of a mixture of 106 parts soda and 116 parts calcium cyanamide (containing 69% CaNCN) were heated as a powder during 15 minutes to 650° C., a current of carbon dioxide being allowed to act on the reaction mass so quickly that no vacuum could form.

The reaction mass was allowed to stand another 15 minutes at 650° C. in a slow current of carbon dioxide, whereupon the test was interrupted. After cooling there resulted 19.22 grams of a reaction mass weighing 3.67 grams (23.6%) more, which contained, besides 0.5% sodium cyanide, 43.3% sodium cyanate. No cyanamide was present anymore. The above shows that 91.5% of the calcium cyanamide introduced were converted into cyanate.

For the sake of comparison 16.725 grams of the above mixture of starting materials were heated, also as a powder, 15 minutes to 650° C. in a nitrogen atmosphere and held another 15 minutes at this temperature as above. The result of this test was a reaction product weighing 16.639 grams or 0.5% less, which contained 2.36% sodium cyanide, 21.2% calcium cyanamide and 12.8% sodium cyanate. The cyanamide nitrogen was thus converted as follows: 5.3% into NaCN; 22% into NaCNO; 58.5% remained cyanamide nitrogen and 14.3% got lost.

Various changes may be made in the details disclosed in the foregoing specification without departing from the invention or sacrificing the advantages thereof.

I claim:

1. The process of producing products containing sodium cyanate, which comprises reacting, at a temperature ranging between 450° and 650° C., an alkaline earth cyanamide with a sodium compound of the group constituted by the sulfide, the fluoride and the carbonate, with a supply of carbon dioxide in a quantity which exceeds the amount of carbon dioxide absorbed during the reaction by the alkaline earth compounds present by at least 11 grams for every 7 grams nitrogen present in the starting mixture in the form of cyanamide nitrogen.

2. The process of producing a product containing sodium cyanate which comprises reacting at a temperature ranging between 450° and 650° C. calcium cyanamide with sodium carbonate, with a supply of carbon dioxide in a quantity which exceeds the amount of carbon dioxide absorbed during the reaction by the alkaline earth compounds present by at least 11 grams for every 7 grams nitrogen present in the starting mixture in the form of cyanamide nitrogen.

3. The process of claim 1, in which the alkaline earth cyanamide is reacted with a mixture containing two different sodium compounds of the kind specified.

4. The process of claim 1, in which the reaction is carried through at a pressure above normal.

HERMANN THEODOR JOSEF KÖNIG.